J. BING.
MACHINE FOR REDUCING TURNING CHIPS AND THE LIKE.
APPLICATION FILED OCT. 25, 1919.

1,415,861. Patented May 16, 1922.
2 SHEETS—SHEET 1.

Inventor
Julius Bing
by Lindley J Murray.
Attorney

J. BING.
MACHINE FOR REDUCING TURNING CHIPS AND THE LIKE.
APPLICATION FILED OCT. 25, 1919.
1,415,861.
Patented May 16, 1922.
2 SHEETS—SHEET 2.
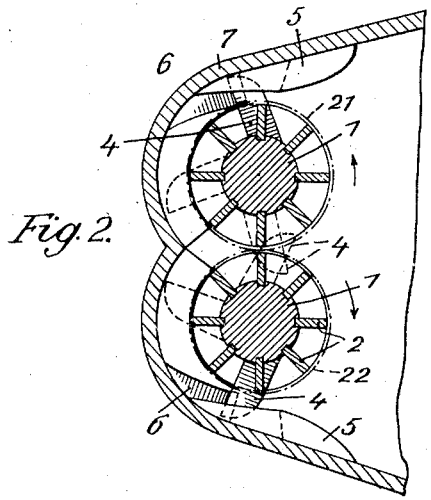
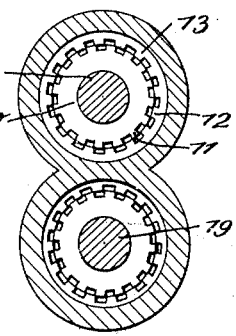
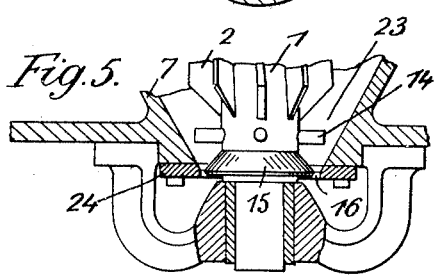
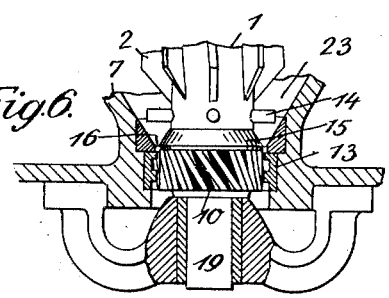

UNITED STATES PATENT OFFICE.

JULIUS BING, OF EISENACH, GERMANY.

MACHINE FOR REDUCING TURNING CHIPS AND THE LIKE.

1,415,861. Specification of Letters Patent. Patented May 16, 1922.

Application filed October 25, 1919. Serial No. 333,381.

(GRANTED UNDER THE PROVISIONS OF THE ACT OF MARCH 3, 1921, 41 STAT. L., 1313.)

*To all whom it may concern:*

Be it known that I, JULIUS BING, a subject of the King of Prussia, residing at 18 An der Fischweide, Eisenach, Germany, have invented certain new and useful Improvements in Machines for Reducing Turning Chips and the like, (for which I have filed applications in Germany December 24, 1917; Luxemburg June 11, 1918, (patented on same date;) Denmark June 12, 1918; Norway June 15, 1918; Sweden June 15, 1918; Austria June 15, 1918; Switzerland June 18, 1918, (patented Feb. 17, 1919;) Netherlands June 19, 1918; Hungary July 8, 1918, (patented Sept. 9, 1919;) France June 27, 1918, and in Great Britain July 5, 1918,) of which the following is a specification.

The present invention relates to a machine for reducing turning chips and the like and has for its object to provide a fine reducing attachment for further reducing the stock coarsely reduced by the main reducing means.

A further object is to ensure a well regulated discharge of the chips to the fine reducing apparatus, by an agitating device arranged between the main disintegrator and the fine reducing apparatus.

A still further object is to retain foreign bodies, as for instance hardened screw steel scrap such as will frequently occur in the chip heaps in factories, from entering into the fine reducing device which is comparatively sensitive against such bodies.

Finally an object of the invention is to control the discharge of the reduced chips out of the machine in order to regulate the degree of disintegration.

In the accompanying drawing several constructional forms of the invention are shown.

Fig. 1 is a fragmentary view of a machine in vertical section,

Fig. 2 a horizontal section along line A—A of Fig. 1,

Fig. 3 a horizontal section along line B—B of Fig. 1.

Fig. 4 shows a detail of the fine reducing attachment.

Figs. 5 and 6 show two modified constructions.

Figure 1:
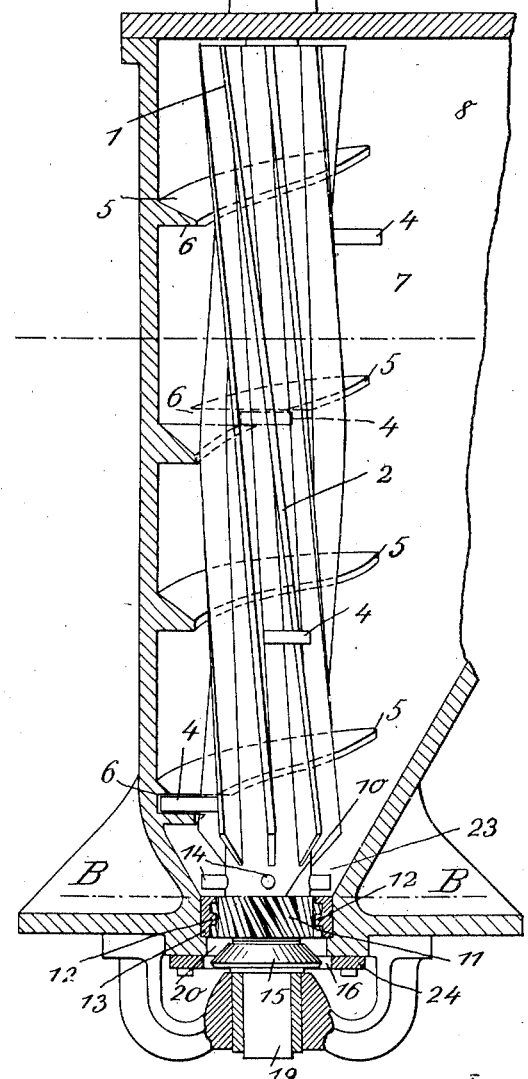

The machine shown in Figs. 1 to 4, which, as far as it does not form the subject matter of the present invention, has been more fully described, and the operating manner of which has been explained in the companion specification of Richard Philipp signed June 22, 1918, has two rollers journalled by shafts 19, which are operatively connected by gear wheels 21, 22. The rollers are fitted with knives 2 extending substantially longitudinally but at an acute angle to the axis and with grippers 4 projecting tooth-like beyond the knives. The rollers are arranged within a casing 7 provided with a hopper 8 through which the chips to be reduced may be supplied. On the inside of the wall of the casing helical webs 5 are provided closely opposite to the knives 2 of the rollers 1, and having breaks 6 in the range of the grippers 4, through which these latter may pass during rotation. When the rollers 1 rotate in the direction of the arrows the grippers seize the chips supplied through the hopper 8 so that the chips are drawn round the rollers along the helical webs 5 and are broken or cut by the cooperation of the knives 2 and the webs or by the cooperation of both rollers, or by the combined cooperation of the rollers with each other and with the helical webs.

The above described means do not form a part of the present invention which will now be explained.

At the lower end of each roller 1 a grinder 10 is fitted to the shaft 19. This grinder has steep helical cutter teeth or ribs 11 cooperating with similar steep helical cutter ribs or webs 12 of a ring 13 surrounding the grinder 10, the ribs 12 being inclined oppositely to the teeth 11 of the grinder 10, so that they are crossing each other. The chips preliminarily reduced by the knife rollers 1 will at the lower end of each roller collect in the space 23 between the lower ends of the knives 2 and the upper surface of the grinder 10 and ring 13 and successively enter between these elements so that by their cooperation they are further reduced. The upper surfaces of the grinder 10 and ring 13 are at the same level and by this arrangement act as a kind of grate and baffle for foreign bodies of greater shape than the chip sections, so that they can not enter the fine reducing device and be seized by the knives. From time to time, when the machine has been stopped, the foreign bodies collected here may be removed.

In order however, to ensure a well regulated discharge of the chips from the space 23 into the fine reducing attachment and to obviate stoppages by the chips settling in the space 23, agitating means are provided in the said space in form of boltlike projections 14 fitted to the lower end of the roller at a short distance above the grinder 10 and ring 13. These projections will agitate and mix up the chips so that they cannot settle.

On the other hand a too rapid outflow of the chips from the fine reducing attachment must be obviated in order to ensure a sufficiently fine reduction. For this purpose a regulating device is arranged below each fine reducing device, consisting of a conical ring 15 fitted on shaft 19, and a ring 24 fitted to the discharge end of the casing and concentrically surrounding said ring 15. These rings, which are preferably made of hardened steel, leave a narrow annular gap 16 between each other, through which gap the reduced stock may pass off. This arrangement allows of regulating the discharge and in connection therewith the degree of disintegration depending on the width of the said annular gap 16 which may be varied by employing rings 15 or 24 of different size. The narrower the gap is made, the more the chips will collect in the space 20 between the grinder 10 and ring 15, so that a correspondingly increasing back pressure is produced within the grinding device and the chips will pass through less rapidly and may be repeatedly seized by the cooperating cutter elements, which of course will result in a finer disintegration.

The agitating device may also be employed in machines having no fine reducing device, as shown in Fig. 5, to ensure a regular discharge of the reduced chips out of the machine. In this case of course also the means controlling the discharge may be provided if desired, as also represented in Fig. 5.

In some instances it may further be desirable to arrange the controlling means above the grinder 10, as shown in Fig. 6. This arrangement affords the advantage that foreign bodies of greater shape than the width of gap 16 are retained in the clear space above the conical ring 15 and therefore are absolutely prevented from entering into the fine reducing attachment.

I claim:

1. In a machine for reducing turning chips and the like, coarse reducing means, fine reducing means arranged behind said coarse reducing means, and an agitating device arranged between said coarse and fine reducing means.

2. In a machine for reducing turning chips and the like, reducing means, and a controlling device for regulating the discharge of the reduced chips from the reducing means.

3. In a machine for reducing turning chips and the like, reducing means, a controlling device for regulating the discharge from the machine and an agitating device to prevent settling of the chips.

4. In a machine for reducing turning chips and the like, coarse reducing means, fine reducing means and a controlling device to regulate the discharge of the reduced chips from said fine reducing means.

5. In a machine for reducing turning chips and the like, coarse reducing means, fine reducing means, agitating means between said coarse and fine reducing means, and a discharge controlling device behind said fine reducing means.

6. In a machine for reducing turning chips and the like, a substantially vertically arranged knife roller, a cutter element cooperating therewith, to draw in and coarsely disintegrate the chips, a grinding wheel on the shaft of and beneath said knife roller, a grinding ring cooperating therewith, and agitator elements arranged above said grinding means.

7. In a machine for reducing turning chips and the like, a substantially vertically arranged knife roller, a cutter element cooperating therewith, to draw in and coarsely disintegrate the chips, a rotating grinding element at the lower end of said roller, a stationary grinding element cooperating therewith, and a controlling device beneath said grinding means.

8. In a machine for reducing turning chips and the like, a casing, reducing means, a discharge opening in said casing beneath said reducing means, and a revolving conical ring beneath said reducing means, forming a discharge gap with an edge of said discharge opening.

9. In a machine for reducing turning chips and the like, reducing means, a revolving conical ring beneath said reducing means, and a stationary ring surrounding said conical ring to form a discharge gap therewith.

10. In a machine for reducing turning chips and the like, reducing means, a revolving conical ring beneath said reducing means, and a stationary ring surrounding said conical ring and co-operating therewith to form a discharge gap, one of the cooperating elements being exchangeable.

11. In a machine for reducing turning chips and the like, reducing means and an exchangeable revolving conical ring beneath said reducing means cooperating with an edge of the discharge opening of the casing to form a discharge gap.

12. In a machine for reducing turning chips and the like, a substantially vertically arranged knife roller, an element cooperating therewith to draw in and disintegrate the chips, a grinding wheel on the shaft of and beneath said knife roller, a grinding ring cooperating therewith, and a conical ring fitted to said shaft beneath said grinding means and forming a gap with the edge of the discharge opening.

13. In a machine for reducing turning chips and the like, a reducing device revolubly arranged on a vertical shaft, and a conical ring fitted to said shaft within the discharge opening of the machine to form a gap with an edge of said opening.

14. In a machine for reducing turning chips and the like, a plurality of reducing elements revolubly arranged on vertical shafts, a separate discharge opening beneath each reducing element, and a controlling device in each such discharge opening.

15. In a machine for reducing turning chips and the like, a plurality of knife rollers revolubly arranged on vertical shafts, a fine reducing grinder beneath each knife roller, a separate discharge opening beneath each grinder, and a controlling device in each such discharge opening.

16. In a machine for reducing turning chips and the like, a plurality of knife rollers revolubly arranged on vertical shafts, a fine reducing grinder beneath each knife roller, a separate discharge opening beneath each grinder, and a conical ring on each shaft beneath said grinder, forming a discharge gap with the edge of said opening.

17. In a machine for reducing turning chips and the like, reducing means, a discharge opening beneath said reducing means, and a discharge controlling device in said opening.

18. In a machine for reducing turning chips and the like, reducing means, a discharge opening beneath said reducing means, a discharge controlling device in said opening, and an agitating device above said discharge opening.

19. In a machine for reducing turning chips and the like, reducing means, a discharge opening beneath said reducing means, a grinding device and a discharge controlling device in said opening, and an agitating device above said grinding and controlling device.

In testimony whereof I affix my signature in presence of two witnesses.

JULIUS BING.

Witnesses:
RICHARD PHILIPP,
PAUL J. ZIMMERMAN.